US012679928B2

(12) United States Patent
Hermant et al.

(10) Patent No.: US 12,679,928 B2
(45) Date of Patent: Jul. 14, 2026

(54) THERMOSETTING BINDER COMPOSITION FOR MANUFACTURING INSULATION PRODUCTS CONTAINING A WATER-SOLUBLE OLIGOMER ESTER

(71) Applicant: SAINT-GOBAIN ISOVER, Courbevoie (FR)

(72) Inventors: Fabien Hermant, Montrouge (FR); Aurélie Legrand, Paris (FR); William Guerin, Rueil-Malmaison (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 627 days.

(21) Appl. No.: 18/256,139

(22) PCT Filed: Dec. 9, 2021

(86) PCT No.: PCT/FR2021/052264
§ 371 (c)(1),
(2) Date: Jun. 6, 2023

(87) PCT Pub. No.: WO2022/129742
PCT Pub. Date: Jun. 23, 2022

(65) Prior Publication Data
US 2024/0034835 A1      Feb. 1, 2024

(30) Foreign Application Priority Data

Dec. 14, 2020      (FR) ...................................... 2013156

(51) Int. Cl.
C08G 63/668      (2006.01)
C03C 25/323      (2018.01)
D04H 1/587      (2012.01)

(52) U.S. Cl.
CPC .......... C08G 63/668 (2013.01); C03C 25/323 (2013.01); D04H 1/587 (2013.01)

(58) Field of Classification Search
None
See application file for complete search history.

(56) References Cited

U.S. PATENT DOCUMENTS 4,418,174 A     11/1983 Dhein et al.
8,808,443 B2     8/2014 Jaffrennou et al.

| 2005/0215153 A1* | 9/2005 | Cossement | ............ D21H 17/31 442/180 |
| 2011/0210280 A1* | 9/2011 | Jaffrennou | .............. C03C 25/34 106/215.2 |
| 2014/0038485 A1* | 2/2014 | Anderson | .............. D06M 15/11 252/8.61 |
| 2019/0100661 A1* | 4/2019 | Stogner | .................... C08K 7/04 |
| 2022/0213628 A1* | 7/2022 | Smith | ...................... C08K 7/14 |

FOREIGN PATENT DOCUMENTS

| FR | 3 089 984 A1 | 6/2020 |
| JP | S48-024488 B1 | 7/1973 |
| JP | S57-180629 A | 11/1982 |
| JP | S58-071960 A | 4/1983 |
| JP | 2002-179783 A | 6/2002 |
| JP | 2012-502199 A | 1/2012 |
| JP | 2014-527126 A | 10/2014 |
| JP | 2016-537524 A | 12/2016 |
| JP | 2021-521290 A | 8/2021 |
| WO | WO 2009/080938 A2 | 7/2009 |
| WO | WO 2010/029266 A1 | 3/2010 |
| WO | WO 2012/138723 A1 | 10/2012 |
| WO | WO 2013/014399 A1 | 1/2013 |
| WO | WO 2013/021112 A1 | 2/2013 |
| WO | WO 2019/202248 A1 | 10/2019 |

OTHER PUBLICATIONS

International Search Report as issued in International Patent Application No. PCT/FR2021/052264, dated Apr. 21, 2022.
Notice of Reasons for Rejection as issued in Japanese Patent Application No. 2023-535843, dated Dec. 9, 2025.

* cited by examiner

*Primary Examiner* — Megan Mcculley
(74) *Attorney, Agent, or Firm* — CUSHMAN PARTNERS, LLC

(57)      ABSTRACT

A thermosetting binder composition containing water and a water-soluble oligomer ester of at least one carbohydrate selected from reducing sugars, non-reducing sugars and hydrogenated sugars, hydrogenated sugars being selected from the group consisting of erythritol, arabitol, xylitol, sorbitol, mannitol, iditol, maltitol, isomaltitol, lactitol, cellobitol, palatinitol, maltotritol and the hydrogenation products of starch hydrolysates or of hydrolysates of lignocellulosic materials; at least one diol; and at least one polycarboxylic acid, the binder composition having a solid matter content ranging between 40% and 80% by weight, the water-soluble oligomer ester accounting for at least 70% by weight of the solid matter of the thermosetting binder composition, and the ratio of the number of hydroxyl groups of all the diols to the number of hydroxyl groups of all the diols and carbohydrates ranging between 5% and 50%.

20 Claims, No Drawings

THERMOSETTING BINDER COMPOSITION FOR MANUFACTURING INSULATION PRODUCTS CONTAINING A WATER-SOLUBLE OLIGOMER ESTER

CROSS-REFERENCE TO RELATED APPLICATIONS

This application is the U.S. National Stage of PCT/FR2021/052264, filed Dec. 9, 2021, which in turn claims priority to French patent application number 2013156 filed Dec. 14, 2020. The content of these applications are incorporated herein by reference in their entireties.

The present application relates to a thermosetting aqueous binder based on water-soluble oligomer esters obtained by reaction between a carbohydrate, a diol and a polycarboxylic acid.

It also relates to the use of such a binder for binding together organic or mineral fibers, preferably mineral wool fibers, in particular glass wool or rock wool.

For several years, it has been known to use aqueous compositions based on biosourced reagents, in particular based on sugars, as thermosetting binders for mineral wool or non-woven products based on mineral fibers.

It has in particular been proposed to form thermoset polyesters by reacting reducing sugars and/or non-reducing sugars and/or hydrogenated sugars, bearing hydroxyl groups, with polycarboxylic acids in the presence of a catalyst, generally sodium hypophosphite (WO 2009/080938, WO 2010/029266, WO 2013/014399, WO 2013/021112).

International application WO2012/138723 discloses binder compositions based on oligomeric and/or polymeric carbohydrates (dextrose equivalent 2-20) and a crosslinking agent selected from polycarboxylic acids. These compositions also contain an oligoester with a weighted average mass between 1,500 and 5,000, obtained by reaction of polycarboxylic acid and glycerol.

The sizing compositions described in the aforementioned documents are dilute, not very viscous aqueous solutions, and monomer reagents. They are generally sprayed on mineral fibers that are still hot, immediately after the formation thereof. Immediately after application of the sizing composition to the fibers, the evaporation of the aqueous phase begins. When the fibers are collected and assembled as a mat on the collecting belt, they are sticky and the sizing composition film that surrounds the glass fibers still contains water.

It is only when the sized mineral wool mat enters the oven, typically thermostatically controlled at temperatures above 180° C., or even above 200° C., that the evaporation of the water is completed and the esterification reaction between the reagents begins.

Heating the mat of sized fibers at high temperatures for a few tens or hundreds of seconds results in the crosslinking of the reactive system by esterification and the formation of an insoluble binder in water, but also results in the thermal decomposition of a portion of the reagents and the evaporation of the formed decomposition products. The gaseous components formed in the oven are partially evacuated via the stack. The exhaust gases, or flue gases, are treated in a washing system and the washing water is then recirculated in a closed system.

When the sizing composition contains citric acid, the fumes contain many acidic compounds (citric acid, citraconic acid, itaconic acid, propionic acid, acetic acid, formic acid) which must be neutralized by adding bases, in order to prevent degradation caused by corrosion of the installation. However, adding bases is problematic. Indeed, in installations for manufacturing insulating products based on mineral wool, the washing waters are reinjected into the system, and are used in particular for the preparation of binder and sizing compositions. The presence of bases or salts in large amounts in sizing compositions is likely to increase the pH and disrupt the esterification reaction (crosslinking).

In international application WO2019/202248, the applicant proposed applying to mineral wool fibers not an aqueous composition containing a mixture of carbohydrate(s) and polycarboxylic acid(s), but rather an aqueous composition containing an oligoester synthesized previously in an anhydrous medium by reaction of a carbohydrate and a polycarboxylic acid. By replacing the monomer (carbohydrate and polycarboxylic acid) reagents with a soluble oligomer, the amount of acidic decomposition products in the flue gases could be reduced considerably.

Furthermore, the use of oligomers made it possible to significantly reduce the temperature of the start of crosslinking of the reactive system and/or to shorten, for a given oven temperature, the duration necessary for satisfactory hardening of the binder.

By continuing its research in order to optimize the method for manufacturing mineral wool described in WO2019/202248, the Applicant has been confronted with the problem of an excessively rapid increase in the viscosity of the oligomer solution as soon as the degree of progress of the esterification reaction (determined by monitoring the disappearance of the acid functions) exceeded a value of about 30%, i.e., when about 30% by number of the carboxylic acid functions introduced initially had disappeared.

This excessively high viscosity of the binder composition is translated into the mineral wool manufacturing process by an excessive and troublesome tack of the mat of sized mineral fibers. After spraying a relatively diluted aqueous sizing composition on freshly formed fibers, the majority of the water evaporates spontaneously due to the high temperature of the fibers. At the moment when the sized fibers are collected on the conveyor which brings them into the oven, the dry matter content is on the order of 40 to 70%. The mat of sized fibers first passes under a compacting roller, then is re-expanded by an air flow coming from below, before entering the cooking oven. Too great a tack of the film of concentrated binder composition results, firstly, in a reduced re-expansion of the mat after compacting (roller) and, secondly, in difficulty at spreading and insufficient migration of the sizing composition toward the points of contact between mineral fibers. The insulation product obtained after the curing of the tacky film then has a higher density, and mechanical properties that are less good than an equivalent insulation product obtained with a less viscous sizing composition, for a given solid content.

The present invention is based on the discovery that the partial replacement of the carbohydrate or carbohydrates by a diol makes it possible to significantly limit, for a given conversion rate and dry matter content, the viscosity of the aqueous compositions of oligoesters. It thus becomes possible to synthesize less viscous oligoesters for a given conversion rate, or oligoesters containing, for a given viscosity, fewer free carboxylic acid functions.

A greater conversion rate results in an additional reduction in the acid degradation products in the flue gas of the chimneys and in a reduction in the temperature of the start of crosslinking.

A first subject matter of the present invention is a thermosetting binder composition containing water and a water-soluble oligomer ester:

of at least one carbohydrate selected from among reducing sugars, non-reducing sugars and hydrogenated sugars, the hydrogenated sugars being selected from the group consisting of erythritol, arabitol, xylitol, sorbitol, mannitol, iditol, maltitol, isomaltitol, lactitol, cellobitol, palatinitol, maltotritol and the hydrogenation products of starch hydrolysates or of hydrolysates of lignocellulosic materials;

of at least one diol; and of at least one polycarboxylic acid, the binder composition having a solid matter content between 40% and 80% by weight, preferably between 40% and 70% by weight, the water-soluble oligomer ester accounting for at least 70% by weight of the solid matter of the thermosetting binder composition, and the ratio of the number of hydroxyl groups of all the diols to the number of hydroxyl groups of all the diols and carbohydrates being between 5% and 50%.

In the present application, the term "carbohydrates" has a broader meaning than is usual here, since it includes not only carbohydrates in the strict sense, i.e. reducing sugars or carbohydrates of the formula $C_n(H_2O)_p$, where p=n (monosaccharides) or p=n–1 (oligo- and polysaccharides) which have at least one aldehyde or ketone group (reducing group), but also the hydrogenation products of these carbohydrates in which the aldehyde or ketone group has been reduced to an alcohol. These hydrogenation products are also called alditols, sugar alcohols or hydrogenated sugars. This term "carbohydrate" also encompasses non-reducing sugars consisting of multiple carbohydrate units of which the hemiacetal hydroxyl-carrying carbons are involved in the osidic bonds linking the units together.

In the present application, the terms "binder composition" and "sizing composition" are not synonyms. The term "binder composition" refers to concentrated aqueous solutions, i.e., with high solids content (several tens of percent). These compositions may be stored and transported. They are rather fluid in order to be able to be pumped, but too viscous to be sprayed as such on the fibers. The term "sizing composition" refers to substantially less concentrated aqueous solutions having a solids content of less than 10% by weight. They are generally obtained by diluting binder compositions with water. They have sufficiently low viscosities to allow their application to mineral wool fibers by spraying onto the mineral wool fibers, by means of nozzles.

In principle, it is possible to use, for the preparation of thermosetting binder compositions of the present invention, any carbohydrate chosen from reducing sugars, non-reducing sugars and hydrogenated sugars.

"Hydrogenated sugar" is intended to mean all the products resulting from the reduction, or hydrogenation, of a saccharide (carbohydrate) selected from monosaccharides, disaccharides, oligosaccharides and polysaccharides, and mixtures of these products. Hydrogenated sugars are also referred to as sugar alcohols, alditols or polyols. They can be obtained by catalytic hydrogenation of saccharides. The hydrogenation can be carried out by known methods, working in conditions of high hydrogen pressure and high temperature, in the presence of a catalyst selected from elements of groups IB, IIB, IVB, VI, VII and VIII of the periodic table of the elements, preferably from the group comprising nickel, platinum, palladium, cobalt, molybdenum and mixtures thereof. The preferred catalyst is Raney nickel.

The hydrogenated sugar(s) are selected from the group consisting of erythritol, arabitol, xylitol, sorbitol, mannitol, iditol, maltitol, isomaltitol, lactitol, cellobitol, palatinitol, maltotritol, and hydrogenation products of starch hydrolysates or of hydrolysates of lignocellulosic materials, in particular hemicellulose, especially xylans and xyloglucans. The hydrogenated sugars used in the present invention consequently do not encompass glycerol or polyglycerol.

Starch hydrolysates are products obtained by enzymatic and/or acid hydrolysis of starch.

The preferred starch hydrolysates, before the hydrogenation step, have a dextrose equivalent (DE) between 5 and 99, and advantageously between 10 and 80.

Particularly preferably, use will be made of a hydrogenated sugar selected from the group consisting of maltitol, xylitol, sorbitol and the hydrogenation products of hydrolysates of starch or of lignocellulosic materials.

Among the hydrogenated sugars described above, sorbitol is the most easily available on the market and the least expensive. The Applicant during its tests aimed at developing binders based on polycarboxylic acids and hydrogenated sugars, however, found that this hydrogenated sugar, when used as-is, does not easily make it possible to obtain insulating products having satisfactory mechanical properties (tensile breaking strength, thickness recovery, flexural strength). To confer a certain mechanical strength on the insulating products obtained, it has been necessary to considerably increase the polycarboxylic acid/sorbitol ratio of the sizing compositions. Such an increase however has a threefold drawback; it increases the corrosive nature of the sizing compositions, promotes the release of acid degradation products at the stack, and reduces the binder line efficiency, in particular when the acid used is citric acid, which undergoes thermal degradation at temperatures below 200° C.

The present invention makes it possible to avoid the disadvantages described above related to the use of sorbitol as hydrogenated sugar. Indeed, the pre-oligomerization of sorbitol in an anhydrous medium in the presence of polycarboxylic acids gives oligoesters which have properties equivalent to those based on xylitol or maltitol for example.

In view of the foregoing, obtaining insulating products based on mineral wool having satisfactory mechanical properties, of course, assumes that no free sorbitol is added to the binder composition after the end of the esterification step. In other words, the advantage of the present invention, namely obtaining good mechanical properties despite the use of sorbitol, would be canceled out if free sorbitol were added in excessive amounts at the time of the preparation of the sizing composition by dilution of the binder composition of the present invention.

The binder composition and the sizing composition of the present invention consequently contain less than 10% by weight, preferably less than 5% by weight, even more advantageously less than 2% by weight of free sorbitol, added after the esterification step or unreacted during esterification. These free sorbitol percentages are related to the total solids content of the binder composition or the sizing composition of the present invention.

The reducing sugars are preferably selected from monosaccharides such as glucose, galactose, mannose and fructose, disaccharides such as lactose, maltose, isomaltose and cellobiose; and starch hydrolysates having a DE between 5 and 98, preferably greater between 15 and 95; and hydrolysates of lignocellulosic materials. Preferably glucose or fructose is used, particularly glucose.

The non-reducing sugars are preferably disaccharides such as trehalose, isotrehaloses, sucrose and isosucroses. Sucrose is particularly preferred.

The polycarboxylic acid(s) used in the present invention are monomeric polycarboxylic acids. In other words, in the present invention, this term does not cover polymers obtained by polymerization of monomeric polycarboxylic acids, such as homopolymers or copolymers of acrylic acid or of methacrylic acid.

Use will preferably be made of polycarboxylic acids selected from the group consisting of dicarboxylic acids, tricarboxylic acids and tetracarboxylic acids. The particularly preferred polycarboxylic acid is citric acid.

The Applicant performed numerous tests to determine the respective proportions of carbohydrate and polycarboxylic acid which lead to binders which, in the crosslinked state, provide the final product with the best mechanical properties, particularly after accelerated aging in humid conditions.

These tests showed that the carbohydrate/citric acid weight ratio is advantageously between 20/80 and 55/45, and preferably between 25/75 and 50/50.

Furthermore, the ratio of the total number of acid groups borne by the polycarboxylic acid to the total number of hydroxyl groups borne by the carbohydrate(s) and the diol(s) is advantageously between 30/70 and 70/30, preferably between 35/60 and 60/40, in particular between 40/60 and 55/45.

The diols used in the present invention to reduce the viscosity of the binder after application to the fibers and thus limit the tack of the mat before curing, are preferably linear or branched aliphatic diols, and consequently do not encompass either aromatic diols or cycloaliphatic diols.

The diols are advantageously aliphatic diols comprising from 2 to 12 carbon atoms, preferably from 2 to 8 carbon atoms. The alkyl chain may comprise one or more oxygen atoms.

Particularly interesting examples of diols include those selected from the group consisting of ethylene glycol, propylene glycol, butanediol, hexanediol, diethylene glycol, and triethylene glycol.

The amount of diol(s) used is such that the ratio of the number of hydroxyl groups of all of diols to the number of hydroxyl groups of all diols and carbohydrates is between 5% and 50%. Below the lower limit of this range, the technical effect (limiting the increase in viscosity and reduction of tack) is insufficient. Beyond the upper limit of this range, it will certainly be difficult to obtain crosslinked binders in a satisfactory manner. The introduction of diols (difunctional compound) into a system based on citric acid and carbohydrates in fact reduces the average functionality of the reaction system.

The ratio of the number of hydroxyl groups of all the diols used to the number of hydroxyl groups of all the diols and carbohydrates is advantageously between 8% and 40%, preferably between 10 and 30%. These percentages are of course understood for the diols and carbohydrates present in the reaction mixture before the esterification step carried out for the synthesis of the oligoester.

The method for preparing the binder composition of the present invention comprises a step of synthesizing the oligomers by esterification of the reagents in an essentially anhydrous medium, then a step of diluting the formed reaction product with water.

More specifically, the method for preparing binder compositions of the present invention comprises heating a mixture of at least one carbohydrate chosen from reducing sugars, non-reducing sugars and hydrogenated sugars, of at least one diol, of at least one polycarboxylic acid and optionally of at least one esterification catalyst, at a temperature between 105° C. and 170° C., preferably between 120 and 150° C., for a period of time between 5 minutes and 10 hours, preferably between 20 minutes and 5 hours, in particular between 30 minutes and 2 hours, so as to form an oligomer ester, and adding a sufficient amount of water to obtain a pumpable aqueous solution of the oligomer ester.

As explained above, the reaction mixture of this mass polycondensation is preferably essentially anhydrous, i.e., it preferably contains less than 2% water, preferably less than 1% water. In some cases, it may be necessary or acceptable to add a small amount of water, generally less than 10% by weight, in order to homogenize the reagents in the reaction mixture. This water required for homogenization then evaporates under the effect of heating.

A preferred embodiment of the method for synthesizing oligoesters comprises heating the carbohydrate and the diol, in the absence of solvent, until complete melting, then adding citric acid and, where appropriate, the catalyst. The reaction times depend on the evolution of the viscosity of the medium during the synthesis.

The degree of progress of the oligomerization reaction can be monitored as follows by viscometry: An aliquot of the reaction medium is taken and diluted with distilled water so as to obtain a solution having a solids content (dry extract) equal to 60%. This solution is introduced into an Anton Paar MCR302 rheometer with a 50 mm upper cone-plate geometry and a 50 mm lower plate geometry, which allows high sensitivity to low viscosities. The viscosity of the oligomers is measured at ambient temperature for shear rates increasing by $5\ s^{-1}$ to $1000\ s^{-1}$, then again decreasing $1000\ s^{-1}$ to $5\ sec^{-1}$. It can be seen that the viscosity does not depend on the shear rate. The oligomer solutions are therefore Newtonian liquids. The viscosities are raised at 20° C. at a shear rate of $100\ s^{-1}$.

The objective of the study of the oligomerization reaction kinetics is to find the best compromise between, on the one hand, an acceptable viscosity, i.e., a sufficiently low viscosity so that the binder compositions, which are rather concentrated, remain pumpable, and on the other hand, the lowest possible crosslinking start temperature.

The crosslinking start temperature is determined by dynamic mechanical thermal analysis (DMTA) which makes it possible to characterize the viscoelastic behavior of a polymeric material. Two fiberglass strips are cut out and superimposed. Thirty milligrams of binder composition having a solid content of 30% are deposited homogeneously on the strips which are then secured horizontally between two jaws of a RSAIII device (Texas Instruments). An oscillating element equipped with a device for measuring the stress as a function of the applied deformation is arranged on the upper face of the specimen. The device makes it possible to determine the elastic modulus E'. The specimen is heated to a temperature varying from 20 to 250° C. at a rate of 4° C./min. From the measurements, the curve of the variation in elastic modulus E' (in MPa) as a function of temperature (in ° C.) is plotted.

The DMTA curves are modeled in three line segments:
(1) tangent to the curve before the start of the reaction,
(2) slope of the straight line during the increase of the modulus during reaction,
(3) tangent to the curve after the end of the increase of the modulus.

The crosslinking start temperature (TR) is the temperature at the intersection of the first two straight lines.

When the desired degree of oligomerization is reached, heating is stopped and water is added to the reaction mixture so as to obtain the binder compositions of the present invention.

The binder composition of the present invention generally contains less than 25% by weight, preferably less than 20% by weight, relative to the solids content, of free residual polycarboxylic acid. The other two types of monomers, namely carbohydrates and diols, are preferably present in only traces quantities, for example in amounts of less than 5% by weight, preferably less than 2% by weight.

The viscosity of the binder compositions, determined at 20° C. at a dry matter content of 60% by weight using a rheometer (an Anton Paar MCR302 rheometer with a 50 mm upper cone-plate geometry and 50 mm lower plate geometry, shear rate 100 s$^{-1}$), is between 50 and 250 mPa·s, preferably between 60 and 200 mPa·s, in particular between 70 and 180 mPa·s.

The mass oligomerization can be carried out in the presence of a known esterification catalyst chosen for example from strong acids such as sulfuric acid, hydrochloric acid, para-toluenesulfonic acid, trifluoromethanesulfonic acid and trifluroacetic acid, and Lewis acids commonly used for the catalysis of esterification reactions.

The mass oligomerization reaction, when it uses citric acid, may also be catalyzed by the sodium hypophosphite which is not strictly speaking an esterification catalyst, but it is believed that it promotes the formation of citric anhydride that is more reactive than the triacid and capable of reacting with the polyols (carbohydrates and diols).

One or the other of these two types of catalysts will therefore be present in the thermosetting binder composition.

When used for the catalysis of the oligomerization reaction, an esterification catalyst such as a strong acid, it is desirable to add to the binder composition, before or after dilution with water in order to obtain the sizing composition, an effective amount of sodium hypophosphite or hypophosphorous acid, for example an amount between 0.5 and 10% by weight, preferably between 1.0 and 5% by weight, relative to the weight of the solids of the binder composition. The sodium hypophosphite and the corresponding acid are in fact, at the present time, the compounds which most effectively catalyze the curing of the oligomers into a thermoset binder that is insoluble in water.

The binder compositions of the present invention must be able to be stored and transported, i.e., they must be stable during storage at room temperature and not undergo substantial hydrolysis of the oligoesters into polyols and polyacid, despite the presence of relatively large amounts of water, which may range from 20 to 60% by weight.

The Applicant has found that good storage stability of the compositions was obtained when they had a neutral or acid pH, preferably between 1 and 7, more preferably between 3 and 6.

The present application also relates to a method for manufacturing a product based on mineral or organic fibers bound by an insoluble organic binder, using a binder composition according to the invention as described above. This method comprises the following successive steps:

(a) preparing a sizing composition by diluting a thermosetting binder composition as described above with water to a solid content between 2 and 10% by weight, (b) applying the sizing composition to mineral or organic fibers, (c) forming an assembly of sized mineral or organic fibers, and (d) heating the assembly of sized mineral or organic fibers obtained until the sizing composition has cured.

To obtain good quality products, it is necessary for the sizing composition to have good sprayability and to be able to be deposited in the form of the thin film on the surface of the fibers so as to bind them effectively.

The ability of the sizing composition to be sprayed is directly related to the possibility of diluting the concentrated binder composition, with a large amount of water. The diluted sizing composition must be a solution that is stable over time, which does not give rise to demixing phenomena.

The suitability for dilution is characterized by the "dilutability" that is defined as being the volume of deionized water that it is possible, at a given temperature, to add to a unit of volume of the binder composition before a permanent haze appears. It is generally considered that a binder composition is suitable for use as sizing when its dilutability is equal to or greater than 1000%, at 20° C.

The binder compositions of the present invention have a dilutability of greater than 2000%.

It is of course quite conceivable to implement the method for manufacturing a product based on mineral or organic fibers of the present invention, by preparing the aqueous sizing composition diluted directly from the oligomerization product obtained by the mass esterification of the polyacid and carbohydrate, without the preparation of a concentrated intermediate solution (binder composition). This variant of the method could be useful when the synthesis of the oligomer ester is done on the same site as the manufacture of the final product based on mineral or organic fibers. It is considered to be perfectly equivalent to that comprising the preparation of an intermediate concentrated solution intended for storage and/or transportation.

The step of preparing the sizing composition advantageously comprises the addition of one or more known additives commonly used in the technical field of mineral wools. These additives are chosen, for example, from anti-dust additives, silicones and coupling agents.

In a particularly preferred embodiment of the method of the invention, one will avoid to add large amounts of monomers capable of reacting with the oligoesters, such as reducing sugars, non-reducing sugars, hydrogenated sugars, or other polyols, or amines, in particular alkanolamines, to the binder composition.

When applied to mineral or organic fibers, the sizing composition preferably comprises at least 70% by weight, more preferably at least 75% by weight, or even at least 80% by weight, relative to its total solids content, of water-soluble oligomer ester.

In an advantageous embodiment of the method of the invention, the fibers are mineral fibers and the assembly of fibers is mineral wool.

The sizing composition is applied to the mineral fibers in a known manner by means of nozzles arranged on spraying rings near the molten glass extrusion devices.

The sized mineral fibers are then gathered in the form of a mat (or loft) on a conveyor belt which passes through the oven.

For the crosslinking of the binder, the assembly of sized mineral fibers is advantageously heated for a period between 20 seconds and 5 minutes, preferably between 30 seconds and 3 minutes at a temperature between 180 and 230° C.

EXAMPLE 1

116.1 g of sorbitol and 57.4 g of butanediol (molar ratio $OH_{butanediol}/OH_{sorbitol}=0.25$) are introduced to a reactor, and they are heated at a temperature of 130° C.; then 326.5 g of citric acid (powdered) is added in portions. The reagents are reacted by stirring the reaction mixture at 130° C. for as long as needed to obtain the desired conversion rate. The formed water is removed by distillation under reduced pressure. When the conversion rate is reached, the heating is stopped and water is added to the reaction medium containing the formed oligomer in order to obtain a dry matter content of 60%.

This protocol is repeated using only 154.6 g of sorbitol (comparative tests without butanediol).

Another series of tests is performed using 139.3 g of sorbitol and 23.0 g of butanediol (molar ratio $OH_{butaneaiol}/OH_{sorbitol}=0.10$).

The conversion rate of the oligomerization reaction (esterification) is followed by acido-basic titration, an aliquot of the reaction medium (approximately 1.0 g) is taken and diluted with distilled water so as to obtain a solution having a dry matter content of about 1%.

The number of residual acid functions in the sampled aliquot is dosed by pH-metry by means of an automatic titrator (addition of 0.1 N NaOH), and then the number of residual acid functions in the reaction product is calculated.

The conversion rate is calculated using the formula $$\text{Conversion (\%)}=100(n_{COOH}-n_{residual})/n_{COOH}$$

where $n_{COOH}$=initial number of carboxylic acid functions $n_{residual}$=number of residual carboxylic acid functions.

The viscosity of the reaction product diluted to 60% dry matter is determined using an Anton Paar MCR302 rheometer with a 50 mm upper cone-plate geometry and a 50 mm lower plate geometry, which allows high sensitivity to low viscosities. The viscosity of the oligomers is measured at room temperature for shear rates increasing by 5 s$^{-1}$ to 1000 s$^{-1}$, then again decreasing 1000 s$^{-1}$ to 5 sec$^{-1}$. It can be seen that the viscosity does not depend on the shear rate. The oligomer solutions are therefore Newtonian liquids. The viscosities measured at 20° C. at a shear rate of 100 s$^{-1}$ are listed in Table 1 below.

TABLE 1

| Carbo-hydrate | $OH_{butanediol}/OH_{sorbitol}$ (%) | Conversion (%) | Viscosity (mPa · s) |
|---|---|---|---|
| (comparative) Sorbitol | 0 | 33 | 101 |
| (comparative) Sorbitol | 0 | 37 | 171 |
| (comparative) Sorbitol | 0 | 38 | 95 |
| (invention) Sorbitol | 10 | 34 | 44 |
| (invention) Sorbitol | 10 | 36 | 82 |
| (invention) Sorbitol | 10 | 38 | 81.3 |
| (invention) Sorbitol | 10 | 39 | 112 |
| (invention) Sorbitol | 25 | 38 | 35 |
| (invention) Sorbitol | 25 | 39 | 31 |
| (invention) Sorbitol | 25 | 42 | 71 |
| (invention) Sorbitol | 25 | 43 | 139 |
| (invention) Sorbitol | 25 | 47 | 125 |
| (invention) Sorbitol | 25 | 55 | 87 |

It is found that, for a given conversion rate, the viscosity of the binder compositions (determined at 20° C. and at a dry matter content of 60%) decreases when some of the sorbitol is replaced by butanediol. Thus, for example, the viscosity of a binder composition prepared from sorbitol and citric acid and having a conversion rate of 38% is 95 mPa·s. When part of the sorbitol is replaced with butanediol ($OH_{butanediol}/$ $OH_{sorbitol}=10\%$) it is 81.3 mPa·s and when further sorbitol is replaced by butanediol ($OH_{butanediol}/OH_{sorbitol}=25\%$) is reduced to 35 mPa·s.

It is also observed that replacing 25% of hydroxyl functions borne by sorbitol with hydroxyl functions borne by butanediol makes it possible to obtain binder compositions having conversion rates of greater than 40 (42 to 55%) and having viscosities that are entirely acceptable (between 71 and 139 mPa·s)

The invention claimed is:

1. A thermosetting binder composition containing water and a water-soluble oligomer ester of:
    at least one carbohydrate selected from among reducing sugars, non-reducing sugars and hydrogenated sugars, the hydrogenated sugars being selected from the group consisting of erythritol, arabitol, xylitol, sorbitol, mannitol, iditol, maltitol, isomaltitol, lactitol, cellobitol, palatinitol, maltotritol and the hydrogenation products of starch hydrolysates or of hydrolysates of lignocellulosic materials;
    at least one diol; and
    at least one polycarboxylic acid,
    the binder composition having a solid matter content between 40% and 70% by weight, the water-soluble oligomer ester accounting for at least 70% by weight of the solid matter of the thermosetting binder composition, and a ratio of a number of hydroxyl groups of all the diols to a number of hydroxyl groups of all the diols and carbohydrates being between 5% and 50%.

2. The thermosetting binder composition according to claim 1, wherein the ratio of the number of hydroxyl groups of all the diols to the number of hydroxyl groups of all the diols and carbohydrates is between 8% and 40%.

3. The thermosetting binder composition according to claim 2, wherein the ratio of the number of hydroxyl groups of all the diols to the number of hydroxyl groups of all the diols and carbohydrates is between 10% and 30%.

4. The thermosetting binder composition according to claim 1, wherein the diols are C$_{2-12}$ aliphatic diols, linear or branched, optionally comprising in the alkyl chain one or more oxygen atoms.

5. The thermosetting binder composition according to claim 4, wherein the diols are selected from the group consisting of ethylene glycol, propylene glycol, butanediol, hexanediol, diethylene glycol and triethylene glycol.

6. The thermosetting binder composition according to claim 4, wherein the diols are C$_{2-8}$ aliphatic diols.

7. The thermosetting binder composition according to claim 1, comprising less than 10% by weight, relative to its solid matter content, of free sorbitol.

8. The thermosetting binder composition according to claim 7, comprising less than 5% by weight, relative to its solid matter content, of free sorbitol.

9. The thermosetting binder composition according to claim 1, wherein the reducing sugars are chosen from monosaccharides, disaccharides, starch hydrolysates having a dextrose equivalent (DE) between 5 and 98, and the hydrolysates of ligno-cellulosic materials.

10. The thermosetting binder composition according to claim 9, wherein the dextrose equivalent (DE) is between 15 and 95.

11. The thermosetting binder composition according to claim 1, wherein the hydrogenated sugars are selected from the group consisting of xylitol, maltitol, sorbitol and the hydrogenation products of hydrolysates of starch or of lignocellulosic materials.

12. The thermosetting binder composition according to claim 1, wherein the at least one polycarboxylic acid is selected from a dicarboxylic acid, a tricarboxylic acid, and a tetracarboxylic acid.

13. The thermosetting binder composition according to claim 1, wherein the at least one polycarboxylic acid is citric acid.

14. The thermosetting binder composition according to claim 13, wherein a ratio of a total number of acid groups borne by the at least one polycarboxylic acid to the total number of hydroxyl groups borne by all the carbohydrates and the diols is between 30/70 and 70/30.

15. The thermosetting binder composition according to claim 13, comprising sodium hypophosphite or hypophosphorous acid.

16. The thermosetting binder composition according to claim 1, comprising less than 25% by weight relative to its solid matter content, of free residual polycarboxylic acid.

17. A method for manufacturing a product based on mineral or organic fibers bonded by an organic binder, said method comprising (a) preparing a sizing composition by diluting a thermosetting binder composition according to claim 1 with water to a solid matter content between 2 and 10% by weight, (b) applying the sizing composition to mineral or organic fibers, (c) forming an assembly of sized mineral or organic fibers, and (d) heating the assembly of sized mineral or organic fibers until the sizing composition has cured.

18. The method according to claim 17, wherein step (a) of preparing the sizing composition comprises adding one or more additives.

19. The method according to claim 17, wherein the fibers are mineral fibers and the assembly of fibers is mineral wool.

20. The method according to claim 17, wherein the sizing composition, when applied to the mineral or organic fibers, comprises less than 10% by weight, relative to its solid matter content, of free sorbitol.

\* \* \* \* \*